United States Patent Office 3,383,505
Patented May 14, 1968

3,383,505
PROCESS FOR COPYING UTILIZING HEAT-SENSITIVE COPYING MATERIALS CONTAINING WATER OF CRYSTALLIZATION THAT CAN BE RELEASED BY HEATING
Kintaro Nasu, 538 Mukaida, and Kinji Ohkubo, 525 Mukaida, both of Minamiashigara-machi, Ashigarakami-gun, Kanagawa-ken, Japan; and Toshihiko Nagai, late of Kanagawa-ken, by Kenichi Nagai, sole heir, Tokyo, Japan
No Drawing. Filed Mar. 9, 1965, Ser. No. 440,062
Claims priority, application Japan, Mar. 12, 1964, 39/13,503
16 Claims. (Cl. 250—65)

ABSTRACT OF THE DISCLOSURE

Heat-sensitive copying materials containing water of crystallization that can be released, in whole or part, by heating. A process for copying wherein the copying material is placed over an original, the printing is by transmittance or reflection of infrared light and the developing is with toner, the toner being attached to the wetted portions of the copying material.

---

The present invention relates to novel heat-sensitive copying materials for obtaining copied images by infrared ray exposure and to a process for copying using such heat-sensitive materials.

More particularly, the invention relates to a process for obtaining copied images by placing over an original to be copied a copying material prepared by coating or vacuum depositing on a support a compound or a mineral which can release a part or all of the water of crystallization by heating, subjecting thus prepared copying material to transmission printing or reflection printing by infrared ray exposure, and then developing with toner.

As the support in this invention may be used a natural or synthetic resin film or a paper subjected to water-proof treatment.

As the compound or the mineral containing the water of crystallization, one that can release the water of crystallization at the temperature range of 30–200° C. is most preferable. As the examples of such materials, sodium acetate ($3H_2O$), cobalt acetate ($4H_2O$), lead acetate ($3H_2O$), sodium phosphate tribasic ($12H_2O$), sodium phosphate dibasic ($12H_2O$), sodium phosphate monobasic ($2H_2O$), sodium pyrophosphate ($10H_2O$), sodium thiosulfate ($5H_2O$), sodium metaborate ($4H_2O$), sodium perborate ($4H_2O$), lanthanum chloride ($7H_2O$), bismuth nitrate ($5H_2O$), sodium sulfate ($10H_2O$), potassium tartarate ($½H_2O$), ferrous sulfate ($7H_2O$), ferrous ammonium sulfate ($12H_2O$), ferric ammonium sulfate ($12H_2O$), ammonium alum ($12H_2O$), and potash alum ($12H_2O$) may be used for the compound and clay and bentonite for the mineral.

The above-mentioned compound or mineral may be applied on a support as an aqueous solution, a suspension or a dispersion and further in a case where a paper is used as the support it may be applied on the support by rubbing the fine powders of the material into the support uniformly.

In the case of preparing the copying material in this invention, a natural or a synthetic resin may be used as a binder. For example, as the binder, an aqueous solution or an aqueous suspension of gelatin, polyvinyl alcohol, polyvinyl pyrrolidone, or polyvinyl butyral may be used. Further, in the case of using a water-insoluble polymer as the binder, a polymer having a property of permeating water is selected and it is used as a solution in a suitable organic solvent. For example, there are a benzene solution of a copolymer of methyl methacrylate and methacrylic acid, an ethyl alcohol solution of N-methoxymethyl polyhexamethylene azipamide, and a benzene solution of ethyl cellulose. In such a solution is dispersed the fine powder, an aqueous concentrated solution or a suspension of the compound or the mineral as defined in this invention, and the suspension is applied on a support followed by drying. In this case, a surface active agent may be added to improve the suspension effect.

In this invention, further, the above-mentioned compound having the water of crystallization may be applied on a support by vacuum deposition. In such a case, the water of crystallization is evaporated at vacuum coating, but when thus vacuum coated material is placed for several minutes to several tenth minutes in air, vapor in air is absorbed by the coated compound again as the water of crystallization.

The term "toner" in this invention means one generally called "powder developer" and may be prepared by dispersing powdered carbons, such as, carbon black and asphalt; inorganic pigment, such as, Chrome Green, Ultramarine Blue, and Cobalt Blue; or organic pigment, such as, indigo and alizarine in a thermoplastic resin, such as, a phenol-formaldehyde resin, a blend of chlorinated naphthalene and polystyrene; and a copolymer of polyvinyl chloride and polyvinyl acetate, and then granulating the suspension into granules of about 0.1 to 20 microns in diameter by a suitable method.

The copying material thus prepared by coating the compound or mineral having the water of crystallization on a support is placed upon an original to be copied (hereinafter called only "original") and exposed to infrared rays. If the blank portions of the original are transparent or translucent to infrared rays, they are exposed from the side of original, that is, they are subjected to transmission printing. While, if the copying material is transparent or translucent to infrared rays, they are exposed from the side of copying material, that is, they are subjected to reflection printing. Thus, the portions of the coated material of the copying material corresponding to the pattern portions of the original are heated more strongly by absorbing infrared rays more largely than the portions corresponding to the blank portions of the original. Hence, the crystals of the compound coated on the heated portions release the water of crystallization, which wets the surface of the copying material at the portions. Therefore, if the copying material exposed to infrared rays is toner-developed by powdering onto the surface of the coated layer a finely powdered toner, there is a difference in adhesivity between the portions where the water of crystallization is released and the portions where no such phenomenon occurs, and hence the toner is attached to the portions where the water of crystallization is released. This is perhaps caused by the phenomenon that only these portions are wetted and then the toner is easily attached to the portions. Thus, a positive copy is obtained from a positive original by the infrared ray exposure of a usual period, which is one of the features of this invention.

If the exposure period by infrared exposure is long, the crystals of the portions of the copying material corresponding to the pattern portions of the original release first the water of crystallization, as mentioned above, which wets the portions of the copying material, but as the infrared ray exposure is further continued the humidity of these portions is evaporated off, which results in reducing the adhesive property of the portions to the toner. On the other hand, the crystals of the copying material corresponding to the blank portions of the original release the water of crystallization caused by the long-period infrared ray exposure, which wets then the portions and increases the adhesive property of the portions to the toner. Therefore, by toner-developing the copying material subjected to the long-period infrared ray exposure, a positive copy can be obtained from a negative original or a negative copy from a positive original, which is another feature of this invention.

The period of time between the infrared ray exposure and the toner development for the copying material is preferably as short as possible. For example, if a copying material is developed within 10 seconds after infrared ray exposure, a good copy is obtained but if the exposed copying material is exposed above 10 minutes after the exposure, the difference in the adhesive power of toner is reduced and then a copy having good contrast is not obtained. However, if the exposed copying material is placed in air for above 24 hours without applying toner development, the exposed copying material can be used again as a copying material which is not subjected to the infrared ray exposure. This is because the crystals from which the water of crystallization had been released are converted into ones having the water of crystallization by absorbing water vapor in air when the copying material is placed in air for a long period of time. This is a further feature of this invention.

After toner development, by fixing the toner by heating the copying material or exposing the copying material to the vapor of an organic solvent, such as, trichlene, Freon, chloroform, or benzene, a permanently stable photographic visible image which is not affected by heat, light, and moisture is obtained.

EXAMPLE 1

Into 200 ml. of water was dissolved 10 g. of gelatin and after adding 80 g. of sodium acetate ($3H_2O$) into the solution, 50 ml. of ethyl alcohol is added into the solution with stirring. The system was then stirred for 2 minutes.

The solution was applied on a film and dried. Thus coated film was placed upon an original and subjected to reflection printing by exposing from the back of the coated film to infrared rays. The infrared ray exposure was conducted using Thermofax Model 46 Secretary (a copying machine manufactured by Sumitomo 3M Co.). Among 12 scales of the copying machine, the scale corresponding the shortest exposure was designated Scale 1, and other scales were designated Scale 2 to Scale 12 in order. When the copying material was exposed by Scale 1 to Scale 6, a positive copy was obtained from a positive original, while by Scale 8 to Scale 12, a negative copy was obtained from a positive original (or a positive copy from a negative original). When the copying material was exposed by Scale 6 to Scale 8, the copy was indistinct.

After exposure, the copying film was toner-developed and fixed in the vapor of trichlene to give a permanently stable visible copied image.

EXAMPLE 2

A solution prepared by dissolving 40 g. of sodium acetate ($3H_2O$) into 50 ml. of water was dispersed in 200 ml. of a 5% benzene solution of ethyl cellulose (esterification degree 50%) with the aid of 0.1 g. of polyoxyethylene (molecular weight 15,000). The solution was applied on a film and dried. Thus obtained copying film was placed upon a transparent original and they were subjected to transmission printing by infrared ray exposure, using the above-mentioned Thermofax copying machine. In this case, by Scale 1 to Scale 12 a positive copy was obtained from a positive original but when they are exposed above 20 times by Scale 12, a positive copy was obtained from a negative original, which could be used as it was as a master for offset printing.

By developing and fixing the exposed copying film as in Example 1, a permanently stable visible image was obtained.

EXAMPLE 3

On a paper applied with a water-proof treatment was vacuum-deposited sodium phosphate ($12H_2O$) in a deposited amount of about 0.2 g./100 sq. cm.

Thus treated paper was placed upon a transparent original and they were subjected to transmission printing by exposing from the side of original to infrared rays. In the case of exposing using the above-mentioned Thermofax copying machine, a positive copy was obtained from a positive original by the exposure below Scale 1 and a positive copy was obtained from a negative original by the exposure above Scale 2.

After exposure, the copying material was subjected to a toner development followed by heating for fixing to give a permanently stable visible copy.

EXAMPLE 4

Ten grams (10 g.) of gelatin was dissolved into 200 ml. of water. After adding 0.5 ml. of a 6% aqueous solution of saponin into the solution, 5 g. of finely powdered bentonite was dispersed in the solution with stirring thoroughly. The suspension was then applied on a film and dried.

By exposing, developing, and fixing thus obtained copying material as in Example 1, a permanently stable visible copy was obtained.

What is claimed is:

1. A process for copying which comprises placing a copying material upon an original to be copied, said copying material having been prepared by applying on a support a material having water of crystallization that can be released, at least in part, by heating, subjecting said copying material and said original to printing by infrared ray exposure, and then developing with toner.

2. The process according to claim 1 wherein said developed copying material is further fixed by heating.

3. The process according to claim 1 wherein said material to be applied on the support is a member selected from the group consisting of sodium acetate ($3H_2O$), cobalt acetate ($4H_2O$), lead acetate ($3H_2O$), sodium phosphate tribasic ($12H_2O$), sodium phosphate dibasic ($12H_2O$), sodium phosphate monobasic ($2H_2O$), sodium pyrophosphate ($10H_2O$), sodium thiosulfate ($5H_2O$), sodium metaborate ($4H_2O$), sodium perborate ($4H_2O$), lanthanum chloride ($7H_2O$), bismuth nitrate ($5H_2O$), sodium sulfate ($10H_2O$), potassium tartarate ($\frac{1}{2}H_2O$), ferrous sulfate ($7H_2O$), ferrous ammonium sulfate ($12H_2O$), ferric ammonium sulfate ($12H_2O$), ammonium alum ($12H_2O$), potash alum ($12H_2O$), clay and bentonite.

4. The process according to claim 1 wherein said toner is one prepared by dispersing in a thermoplastic resin a member selected from the group consisting of finely powdered carbons, inorganic pigments and organic pigments.

5. The process according to claim 1, wherein the printing is transmission printing.

6. The process according to claim 1, wherein the printing is reflective printing.

7. The process according to claim 1, where said developed copying material is further fixed by exposure to the vapor of an organic solvent.

8. The process according to claim 1, wherein the copying material is one that has been prepared by vacuum depositing said material containing water of crystallization on said support.

9. A process for copying which comprises placing a copying material upon an original to be copied, said copying material having been prepared by applying on a support a material having water of crystallization that can be released, at least in part, by heating, subjecting said copying material and said original to printing by exposure to infrared rays for a comparatively short period of time to release said water of crystallization of the exposed portion corresponding the pattern portions of said original and wet the portions with thus released water of crystallization, and then developing with toner, whereby only the wetted portions are attached with the toner to give a positive copy from a positive original.

10. The process according to claim 9, wherein the printing is transmission printing.

11. The process according to claim 9, wherein the printing is reflective printing.

12. A process for copying which comprises placing a copying material upon an original to be copied, said copying material having been prepared by applying on a support a material having water of crystallization that can be released, at least in part, by heating, subjecting said copying material and said original to printing by exposure to infrared rays for a long period of time to evaporate off the water of crystallization released from the exposed portions corresponding to the pattern portions of the original and further release the water of crystallization of said material at the portions corresponding to the blank portions of the original to wet said portions, and then developing by toner, whereby only the wetted portions corresponding to the blank portions of the original are attached with the toner to give a positive copy from a negative original or a negative copy from a positive original.

13. The process according to claim 12, wherein the printing is transmission printing.

14. The process according to claim 12, wherein the printing is reflective printing.

15. A copying material comprising a support and a heat-sensitive layer containing a material having water of crystallization that can be released, at least in part by heating.

16. The copying material according to claim 15 wherein said material having the water of crystallization is a member selected from the group consisting of sodium acetate ($3H_2O$), cobalt acetate ($4H_2O$), lead acetate ($3H_2O$), sodium phosphate tribasic ($12H_2O$), sodium phosphate dibasic ($12H_2O$), sodium phosphate monobasic ($2H_2O$), sodium pyrophosphate ($10H_2O$), sodium thiosulfate ($5H_2O$), sodium metaborate ($4H_2O$), sodium perborate ($4H_2O$), lanthanum chloride ($7H_2O$), bismuth nitrate ($5H_2O$), sodium sulfate ($10H_2O$), potassium tartarate ($\frac{1}{2}H_2O$), ferrous sulfate ($7H_2O$), ferrous ammonium sulfate ($12H_2O$), ferric ammonium sulfate ($12H_2O$), ammonium alum ($12H_2O$), potash alum ($12H_2O$), clay, and bentonite.

References Cited
UNITED STATES PATENTS

| | | | |
|---|---|---|---|
| 3,140,143 | 7/1964 | Kaspaul et al. | 346—1 |
| 3,196,029 | 7/1965 | Lind | 117—1.7 |

RALPH G. NILSON, *Primary Examiner.*

A. L. BIRCH, *Assistant Examiner.*